US012205593B2

(12) United States Patent
Jin et al.

(10) Patent No.: US 12,205,593 B2
(45) Date of Patent: Jan. 21, 2025

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Jangho Jin, Suwon-si (KR); Hyundon Yoon, Suwon-si (KR); Gaeul Kim, Suwon-si (KR); Hyungsun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/318,440

(22) Filed: May 16, 2023

(65) Prior Publication Data
US 2023/0282213 A1  Sep. 7, 2023

Related U.S. Application Data

(63) Continuation of application No. 17/121,196, filed on Dec. 14, 2020.
(Continued)

(30) Foreign Application Priority Data

Dec. 31, 2019  (KR) .................. 10-2019-0179671

(51) Int. Cl.
*G10L 15/22* (2006.01)
*G06F 3/16* (2006.01)
*H04N 21/422* (2011.01)

(52) U.S. Cl.
CPC .............. *G10L 15/22* (2013.01); *G06F 3/167* (2013.01); *H04N 21/42203* (2013.01); *G10L 2015/223* (2013.01)

(58) Field of Classification Search
CPC .... G10L 15/22; G10L 2015/223; G06F 3/167
See application file for complete search history.

(56) References Cited

U.S. PATENT DOCUMENTS 9,672,812 B1  6/2017  Watanabe et al.
10,186,265 B1  1/2019  Lockhart et al.
(Continued)

FOREIGN PATENT DOCUMENTS

EP  3404655 B1  9/2020
JP  2602342 Y2  1/2000
(Continued)

OTHER PUBLICATIONS

Communication dated Mar. 16, 2021, issued by the International Searching Authority in counterpart International Application No. PCT/KR2020/018077 (PCT/ISA/210 and 237).

*Primary Examiner* — Ibrahim Siddo
(74) *Attorney, Agent, or Firm* — Sughrue Mion, PLLC (57) ABSTRACT

An electronic device including a speaker; a microphone; a memory configured to store a voice recognition model; and a processor configured to: identify, while a first sound signal is input through the microphone, whether a wake-up word is included in a second sound signal that is output through the speaker by inputting the second sound signal into a wake-up word detection model, and identify, based on identifying that the wake-up word is not included in the second sound signal, whether the wake-up word is included in the first sound signal by inputting the first sound signal into the wake-up word detection model.

6 Claims, 8 Drawing Sheets

Related U.S. Application Data (60) Provisional application No. 62/947,225, filed on Dec. 12, 2019.

(56) References Cited

U.S. PATENT DOCUMENTS

| | | |
|---|---|---|
| 10,832,670 B2 | 11/2020 | Park et al. |
| 10,997,973 B2 | 5/2021 | Choi et al. |
| 2018/0211665 A1 | 7/2018 | Park et al. |
| 2019/0035398 A1 | 1/2019 | Choi et al. |
| 2019/0066680 A1 | 2/2019 | Woo et al. |
| 2019/0096398 A1 | 3/2019 | Sereshki |
| 2019/0311715 A1 | 10/2019 | Pfeffinger et al. |
| 2019/0311719 A1* | 10/2019 | Adams .................. G10L 15/30 |
| 2021/0056971 A1 | 2/2021 | Park et al. |

FOREIGN PATENT DOCUMENTS

| | | |
|---|---|---|
| JP | 2019045532 A | 3/2019 |
| KR | 10-2017-0093629 A | 8/2017 |
| KR | 10-2018-0085931 A | 7/2018 |
| KR | 1020180127102 A | 11/2018 |
| KR | 10-2019-0022109 A | 3/2019 |
| KR | 101970731 B1 | 5/2019 |
| KR | 1020190050225 A | 5/2019 |

* cited by examiner

ELECTRONIC DEVICE AND METHOD FOR CONTROLLING ELECTRONIC DEVICE

CROSS-REFERENCE TO RELATED APPLICATION(S)

This application is a Continuation application of U.S. application Ser. No. 17/121,196 filed on Dec. 14, 2020, which is based on and claims priority under 35 U.S.C. § 119 to Korean Patent Application No. 10-2019-0179671, filed on Dec. 31, 2019, in the Korean Intellectual Property Office, and U.S. Provisional Application No. 62/947,225, filed on Dec. 12, 2019, in the U.S. Patent and Trademark Office, the disclosures of which are herein incorporated by reference in their entireties.

BACKGROUND

1. Field

The disclosure relates to an electronic device and a method for controlling the electronic device, and more particularly, to an electronic device for activating a voice recognition model based on a sound signal output from the electronic device and a sound signal input through a microphone, and a method for controlling the electronic device.

2. Description of the Related Art

Existing voice recognition devices perform voice recognition processing using a sound source input through a microphone. However, the sound source input to the microphone may include not only a user's speech, but also an output from a speaker of the voice recognition device. Therefore, conventionally, an acoustic echo cancellation (AEC) technology has been used to distinguish the user's speech input to the microphone and the output from the speaker of the voice recognition device.

The AEC technology is a technology that extracts only a voice based on the user's speech by converting the sound source input to the microphone and the sound source output from the voice recognition device into a frequency domain, and then subtracting a signal value of a voice output from the voice recognition device from a signal value of the sound source input to the microphone.

However, the AEC technology is limited because the voice output from the voice recognition device and the voice input to the microphone should be synchronized in time. In addition, the cost of developing and manufacturing the voice recognition device may increase because an amount of calculations increases to synchronize each voice in order to utilize the AEC technology.

SUMMARY

According to an aspect of the disclosure, an electronic device may include a speaker; a microphone; a memory configured to store a voice recognition model; and a processor. The processor may be configured to: identify, while a first sound signal is input through the microphone, whether a wake-up word is included in a second sound signal that is output through the speaker by inputting the second sound signal into a wake-up word detection model, and identify, based on identifying that the wake-up word is not included in the second sound signal, whether the wake-up word is included in the first sound signal by inputting the first sound signal into the wake-up word detection model.

The processor may be further configured to, based on identifying that the wake-up word is included in the first sound signal, activate the voice recognition model.

The processor may be further configured to, based on identifying that the wake-up word is included in the second sound signal, control the voice recognition model so as not to be activated.

The processor may be further configured to identify whether a first wake-up word among a plurality of wake-up words corresponding to each of a plurality of voice recognition models is included in the second sound signal by inputting the second sound signal into a wake-up word detection model corresponding to each of the plurality of voice recognition models, based on the plurality of voice recognition models being stored in the memory.

The processor may be further configured to, based on identifying that the first wake-up word is not included in the second sound signal, identify whether the first wake-up word is included in the first sound signal by inputting the first sound signal into the wake-up word detection model corresponding to each of the plurality of voice recognition models.

According to another aspect of the disclosure, an electronic device may include a speaker; a microphone; a memory configured to store one or more voice recognition models; and a processor configured to: identify whether a first wake-up word among one or more wake-up words corresponding to each of the one or more voice recognition models is included in a first sound signal that is input through the microphone by inputting the first sound signal into a wake-up word detection model corresponding to each of the one or more voice recognition models, and identify, based on identifying that the first wake-up word is included in the first sound signal, whether the first wake-up word is included in a second sound signal output through the speaker by inputting the second sound signal into a wake-up word detection model corresponding to the first wake-up word.

The processor may be further configured to, based on identifying that the first wake-up word is included in the second sound signal through the wake-up word detection model, control the one or more voice recognition models so as not to be activated.

The processor may be configured to, based on identifying that the first wake-up word is not included in the first sound signal, control the one or more voice recognition models so as not to be activated.

According to another aspect of the disclosure, a method for controlling an electronic device including a memory that stores a voice recognition model, may include: identifying, while a first sound signal is input through a microphone, whether a wake-up word is included in a second sound signal that is output through a speaker by inputting the second sound signal into a wake-up word detection model; and identifying, based on identifying that the wake-up word is not included in the second sound signal, whether the wake-up word is included in the first sound signal by inputting the first sound signal into the wake-up word detection model.

The method may further include activating the voice recognition model based on identifying that the wake-up word is included in the first sound signal.

The method may further include controlling the voice recognition model so as not to be activated based on identifying that the wake-up word is included in the second sound signal.

The identifying of whether the wake-up word is included in the second sound signal may include identifying whether a first wake-up word among a plurality of wake-up words corresponding to each of a plurality of voice recognition models is included in the second sound signal by inputting the second sound signal into a wake-up word detection model corresponding to each of the plurality of voice recognition models, based on the plurality of voice recognition models being stored in the memory.

The identifying of whether the first wake-up word among the plurality of wake-up words corresponding to each of the plurality of voice recognition models is included in the second sound signal may include identifying whether the first wake-up word is included in the first sound signal by inputting the first sound signal into the wake-up word detection model corresponding to each of the plurality of voice recognition models based on identifying that the first wake-up word is not included in the second sound signal.

According to another aspect of the disclosure, a method for controlling an electronic device including a memory that stores one or more voice recognition models, the method may include identifying whether a first wake-up word among one or more wake-up words corresponding to each of the one or more voice recognition models is included in a first sound signal that is input through a microphone by inputting the first sound signal into a wake-up word detection model corresponding to each of the one or more voice recognition models; and identifying, based on identifying that the first wake-up word is included in the first sound signal, whether the first wake-up word is included in a second sound signal that is output through a speaker by inputting the second sound signal into a wake-up word detection model corresponding to the first wake-up word.

The method may further include controlling the one or more voice recognition models so as not to be activated based on identifying that the first wake-up word is included in the second sound signal through the wake-up word detection model corresponding to the first wake-up word.

The method may further include controlling the one or more voice recognition models so as not to be activated based on identifying that the first wake-up word is not included in the first sound signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The present disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

A term "user" may refer to a person that uses an electronic device or an apparatus (e.g., an artificial intelligence electronic device) that uses the electronic device. Hereinafter, the disclosure will be described in more detail with reference to the drawings.

The disclosure provides an electronic device for identifying whether to activate a voice recognition model by analyzing a sound signal output from the electronic device and a sound signal input through a microphone, and a method for controlling the electronic device.

Hereinafter, embodiments of the disclosure will be described in detail with reference to the accompanying drawings so that those skilled in the art to which the disclosure pertains may easily practice the disclosure.

Figure 1A:
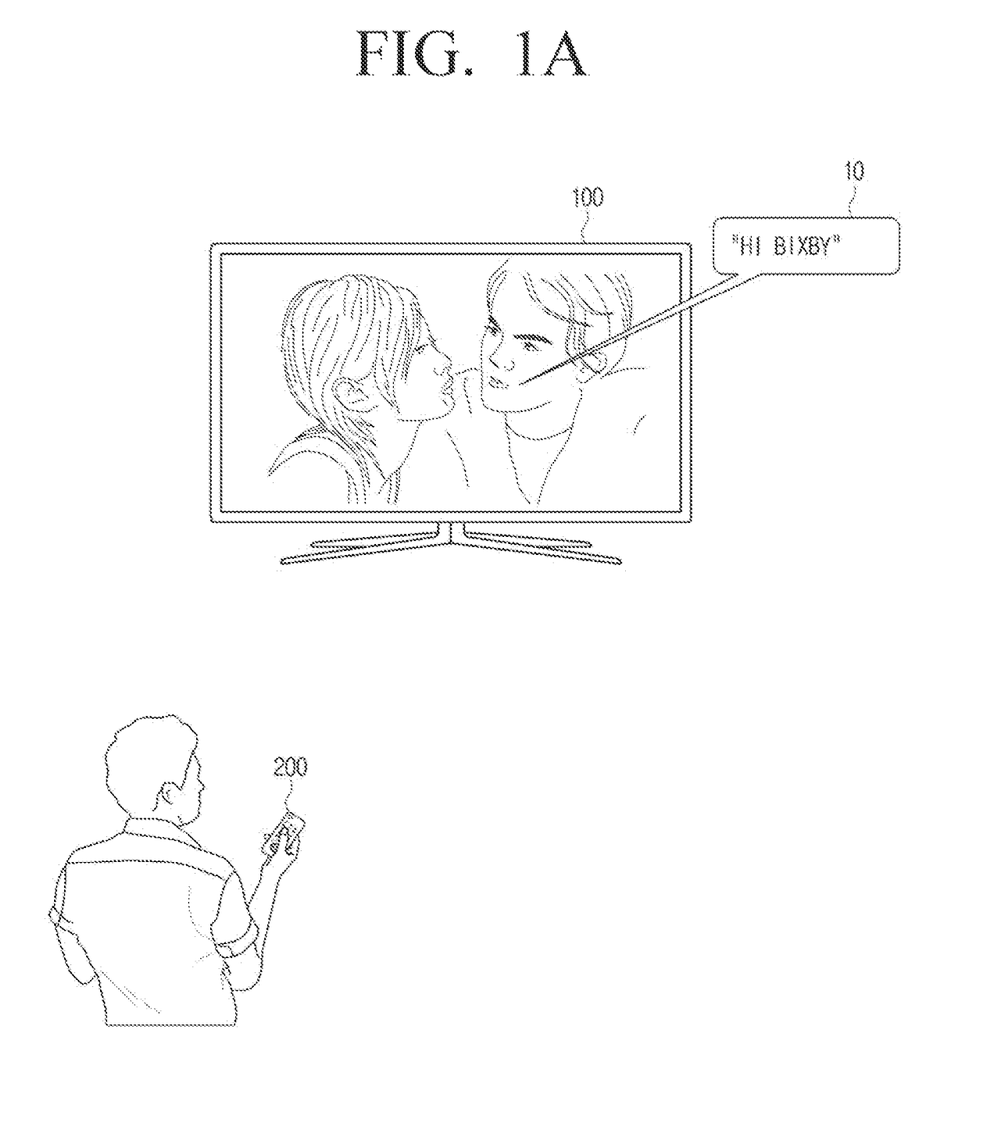
FIGS. 1A and 1B are diagrams of a method of activating a voice recognition model by an electronic device according to an embodiment.
Figure 1B:
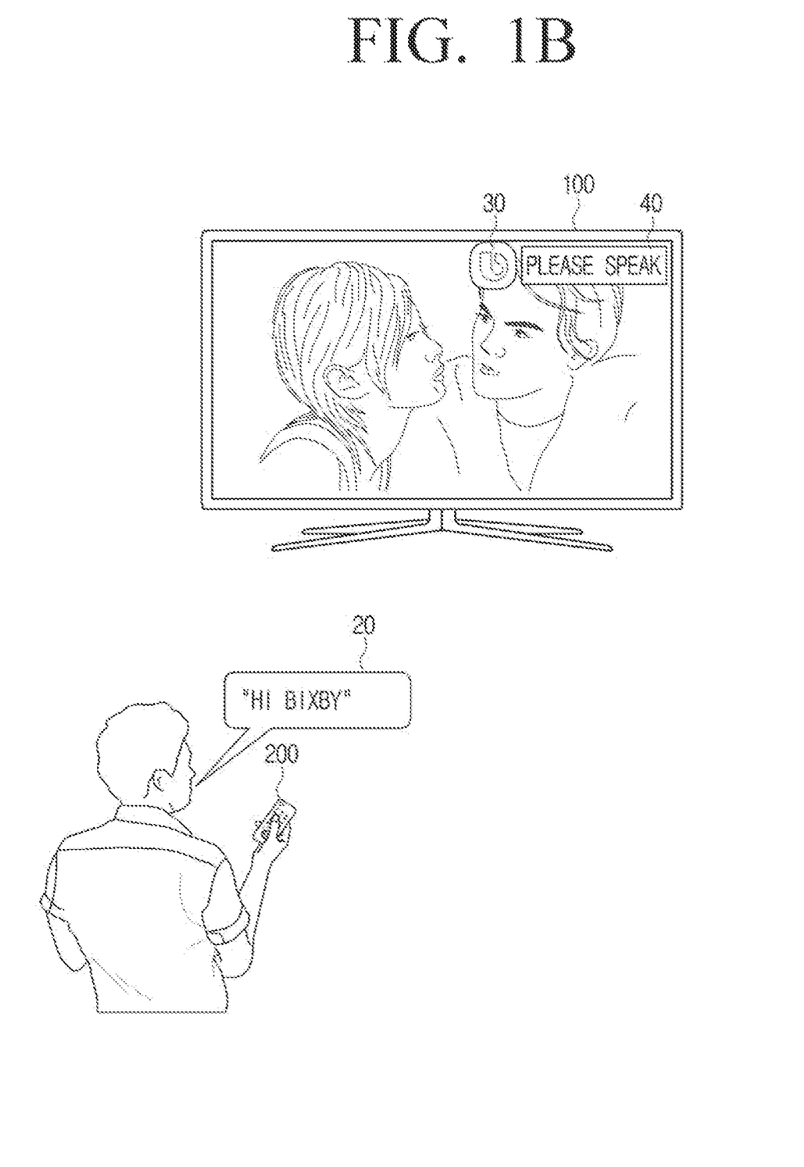

FIGS. 1A and 1B are diagrams for describing a method of activating a voice recognition model by an electronic device 100 according to an embodiment. As illustrated in FIGS. 1A and 1B, the electronic device 100 may be implemented as a display device, but this is only an example, and the electronic device 100 may include at least one of a tablet personal computer (PC), a desktop PC, a laptop PC, a netbook computer, a server, a medical device, or a wearable device. In addition, according to another embodiment, the electronic device 100 may be implemented as at least one of a refrigerator, an air conditioner, an air purifier, a set-top box, or a media box (e.g., Samsung HomeSync™, Apple TV™, or Google TV™). In addition, as shown in FIGS. 1A and 1B, a microphone 120 may be implemented as a configuration included in a remote control 200 that controls the electronic device 100, but this is only an example, and the microphone 120 may be built into the electronic device 100.

The electronic device 100 may output a sound signal through a speaker 110, and the output sound signal may be input to the microphone 120 included in the remote control 200 or built in the electronic device 100. A first sound signal including various sound signals (e.g., a voice of a user located around the microphone 120) generated around the microphone 120 as well as the sound signal output from the electronic device 100 may be input to the microphone 120. As shown in FIGS. 1A and 1B, when the microphone 120 is included in the remote control 200, the first sound signal input to the microphone 120 may be input into a processor 140 in the electronic device 100 through a wired/wireless interface (e.g., Wi-Fi, a Bluetooth module, and the like).

According to another embodiment, the electronic device 100 may receive the first sound signal from a user terminal device that executes an application that controls the electronic device 100. Specifically, the electronic device 100 may be communicated with the user terminal device through various communication methods such as a Wi-Fi Direct method and Bluetooth. In addition, when the user terminal device receives the first sound signal through the microphone included in the user terminal device while executing the application that controls the electronic device 100, the user terminal device may transmit the first sound signal to the electronic device 100. That is, the electronic device 100 may not only receive the first sound signal through the built-in microphone 120 or the microphone 120 included in the remote control 200, but also receive the first sound signal from the user terminal device that executes the application capable of controlling the electronic device 100. The user terminal device may be implemented as various electronic devices such as a smartphone, a tablet PC, and a laptop.

As shown in FIG. 1A, the electronic device 100 may output a second sound signal (e.g., "Hi Bixby") 10 including a wake-up word through the speaker 110. Meanwhile, the electronic device 100 may store the second sound signal 10 in a storage configuration in the electronic device 100 such as a register or a volatile memory in the processor 140. In addition, the electronic device 100 may output the second sound signal 10 through the speaker 110 at the same time as the storage of the second sound signal 10 or within a threshold time. That is, the electronic device 100 may classify the first sound signal and the second sound signal by storing the second sound signal 10 output through the speaker 110 in the register or the volatile memory, and storing the first sound signal input through the microphone 120 included in the remote control 200 in another region of the register or the volatile memory.

The wake-up word may be a word that activates a voice recognition model, which may be an artificial intelligence model that may provide a response to a user's voice stored in the electronic device 100, and may also be expressed as a trigger word or a call word. The wake-up word may be a predefined word when the electronic device 100 is manufactured and may be added/changed/deleted by a user. In addition, the activation of the voice recognition model may mean an operation in which the voice recognition model stored in a non-volatile memory is loaded into the volatile memory to perform a voice recognition function.

While the first sound signal is input through the microphone 120, the electronic device 100 may identify whether the wake-up word is included in the second sound signal 10 by inputting the second sound signal 10 output through the speaker 110 into a wake-up word detection model. When the microphone 120 is included in the remote control 200, a delay may occur while the first sound signal input to the microphone 120 is input to the electronic device 100 through a communication module of the remote control 200. Therefore, as an example, the electronic device 100 may identify whether the wake-up word is included in the second sound signal 10 while the delay occurs. As another example, even if the first sound signal is input from the remote control 200 including the microphone 120, the electronic device 100 may perform an operation related to the first sound after identifying whether the wake-up word is included in the second sound signal 10. As another example, the electronic device 100 may perform the operation related to the first sound after a threshold time since an operation of identifying whether the wake-up word is included in the second sound signal 10 starts.

The wake-up word detection model stored in the electronic device 100 may identify whether a predefined wake-up word is included in the first and second sound signals using a keyword spotting technique or the like.

As shown in FIG. 1A, when it is identified that the wake-up word is included in the second sound signal 10, the electronic device 100 may control the voice recognition model so as not to be activated. Specifically, the wake-up word included in the sound signal output from the speaker 110 may not be a wake-up word uttered by the user for the purpose of activating the voice recognition model. Therefore, when it is identified that the wake-up word is included in the second sound signal 10 output through the speaker 110, the electronic device 100 may control the voice recognition model so as not to be activated even if the wake-up word is included in the first sound signal.

As an example, when it is identified that the wake-up word is not included in the second sound signal 10, the electronic device 100 may identify whether the wake-up word is included in the first sound signal by inputting the first sound signal input through the microphone 120 to the wake-up word detection model. As another example, when it is identified that the wake-up word is not included in the second sound signal 10, the electronic device 100 may identify whether the wake-up word is included in the first sound signal by inputting the first sound signal to the wake-up word detection model after the threshold time since the operation of identifying whether the wake-up word is included in the second sound signal 10 starts. At this time, when it is identified that the wake-up word is included in the second sound signal 10, the electronic device 100 may stop the operation of identifying whether the wake-up word is included in the first sound signal and control the voice recognition model so as not to be activated.

In addition, when it is identified that the wake-up word is included in the first sound signal, the electronic device 100 may activate the voice recognition model. That is, the wake-up word included in the first sound signal is not the wake-up word output through the speaker 110 of the electronic device 100, but may be a wake-up word uttered by the user for the purpose of activating the voice recognition model. Therefore, as shown in FIG. 1B, when the wake-up word is not included in the second sound signal 10, but is included in the first sound signal 20, the electronic device 100 may activate the voice recognition model.

In addition, as shown in FIG. 1B, when the voice recognition model is activated, the electronic device 100 may display an indicator 30 indicating that the voice recognition model is activated or a message 40 for inquiring about a request to the user. However, this is only an example, and the electronic device 100 may display various indicators or user interfaces (UIs) indicating that the voice recognition model is activated.

For example, the electronic device 100 may perform control so that parameters for performing operations included in the wake-up word detection model to which the first sound signal is input and the wake-up word detection model to which the second sound signal is input are different from each other. The first sound signal input through the microphone 120 may include interference effects and reverberation effects due to a relatively large amount of noise compared to the second sound signal output through the speaker 110. Therefore, when it is identified whether the wake-up word is included in the first sound signal, the electronic device 100 may change the parameters of the wake-up word detection model to identify the wake-up word while removing the noise and reverberation effects. However, this is only an example, and the detection model for detecting the wake-up word included in the first sound signal and the detection model for detecting the wake-up word included in the second sound signal may be implemented as separate models.

In addition, the electronic device 100 may store one or more voice recognition models. When there are one or more voice recognition models, the wake-up word for activating each of the one or more voice recognition models may also be different. For example, if a wake-up word capable of activating a first voice recognition model is "Hi Bixby" illustrated in FIGS. 1A and 1B, a wake-up word capable of activating a second voice recognition model may be "Hello Mogul". In addition, wake-up detection word models capable of identifying the wake-up words corresponding to one or more voice recognition models may be implemented as different models. Therefore, when a plurality of voice recognition models are stored, the electronic device 100 may identify whether one of the wake-up words corresponding to each of the plurality of voice recognition models is included in the second sound signal by inputting the second sound signal 10 into all of the wake-up word detection models corresponding to each of the plurality of voice recognition models.

In addition, when it is identified that the wake-up words corresponding to each of the plurality of voice recognition models are not included in the second sound signal, the electronic device 100 may identify whether one of the wake-up words corresponding to each of the plurality of voice recognition models is included in the first sound signal by inputting the first sound signal to all of the wake-up word detection models corresponding to each of the plurality of voice recognition models. In addition, when it is identified that one of the wake-up words is included in the first sound signal, the electronic device 100 may activate the voice recognition model corresponding to the wake-up word. Meanwhile, when it is identified that the wake-up word is not included in the first sound signal, the electronic device 100 may control all of the one or more voice recognition models so as not to be activated. That is, even when the plurality of voice recognition models are stored, the electronic device 100 may identify whether the wake-up word input through the microphone 120 is a wake-up word suitable for the user's intention for activating the voice recognition model.

According to another embodiment, the electronic device 100 may identify whether the wake-up word is included in the first sound input through the microphone 120 before identifying whether the wake-up word is included in the second sound signal output through the speaker 110.

As described above, when the one or more voice recognition models are stored, the electronic device 100 may store the wake-up word detection model capable of identifying the wake-up word capable of activating each of the one or more voice recognition models. Therefore, the electronic device 100 may identify whether one of the wake-up words corresponding to each of the one or more voice recognition models is included in the first sound signal by inputting the first sound signal 20 input through the microphone 120 into the first wake-up word detection model corresponding to each of the one or more voice recognition models. That is, the electronic device 100 may store the second sound signal in a storage space such as a register or a volatile memory, and may first identify whether one of the wake-up words corresponding to the one or more voice recognition models is included in the first sound signal 20.

When it is identified that one of the wake-up words is included in the first sound signal, the electronic device 100 may identify whether one of the corresponding wake-up words is included in the second sound signal by inputting the second sound signal 10 output through the speaker 110 into the second wake-up word detection model corresponding to one of the wake-up words identified as being included in the first sound signal. In addition, when it is identified that one of the wake-up words is included in the second sound signal, the electronic device 100 may control the voice recognition model so as not to be activated. That is, the electronic device 100 does not input the second sound signal to all of the second wake-up word detection models corresponding to the one or more voice recognition models, and may input the second sound signal to only one second wake-up word detection model corresponding to a specific wake-up word identified as being included in the first sound signal. In addition, when it is identified that the specific wake-up word is included in the second wake-up word detection model, this indicates that a sound signal including the specific wake-up word is output through the speaker 110, and therefore, the electronic device 100 may control the voice recognition model so as not to be activated.

For example, when it is identified that 'Hi Bixby', which is one of the wake-up words, is included in the first sound signal, the electronic device 100 may input the second sound signal to a second wake-up word detection model capable of identifying and detecting 'Hi Bixby' among at least one second wake-up word detection model. In addition, when it is identified that 'Hi Bixby' is not included in the second sound signal through the corresponding detection model, the electronic device 100 may activate the voice recognition model.

Meanwhile, when it is identified that one of the wake-up words corresponding to one or more voice recognition models is not included in the first sound signal, the electronic device 100 may control the voice recognition model so as not to be activated. That is, because the wake-up word is not included in the first sound signal input through the microphone 120 may mean that the user has not uttered the wake-up word, the electronic device 100 may not activate the voice recognition model.

Figure 2A:
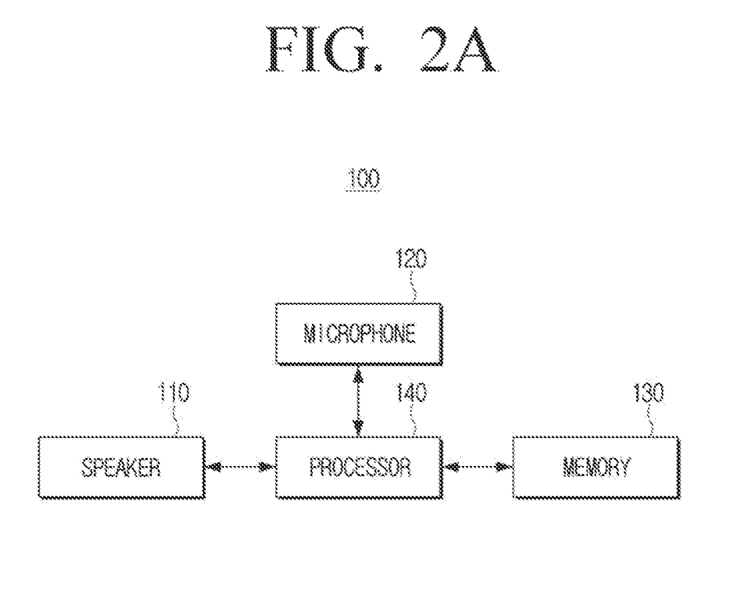
FIG. 2A is a block diagram schematically illustrating a configuration of an electronic device according to an embodiment.

FIG. 2A is a block diagram schematically illustrating a configuration of the electronic device 100 according to an embodiment. As illustrated in FIG. 2A, the electronic device 100 may include a speaker 110, a microphone 120, a memory 130, and a processor 140. However, the configuration illustrated in FIG. 2A is an example diagram for implementing the embodiments of the present disclosure, and appropriate hardware and software configurations that are known in the art may be additionally included in the electronic device 100.

The speaker 110 may be a component that outputs not only various audio data on which various processing tasks such as decoding, amplification, and noise filtering have been performed by an audio processor, but also various notification sounds or voice messages. The component for outputting audio may be implemented as a speaker, but this is only an example, and may be implemented as an output terminal capable of outputting audio data. In addition, the second sound signal to be output from the speaker 110 may be stored in a register or a volatile memory under the control of the processor 140.

The microphone 120 may be a component capable of receiving the first sound signal including an ambient sound signal from the electronic device 100. As an example, the microphone 120 may be included in the remote control 200 capable of controlling the electronic device 100. At this time, the first sound signal input to the microphone 120 may be input to the processor 140 through a wired/wireless interface (e.g., Wi-Fi, a Bluetooth module, and the like). As another example, the microphone 120 may be built into the electronic device 100.

The memory 130 may store commands or data related to one or more other components of the electronic device 100. In particular, the memory 130 may be implemented as a non-volatile memory (e.g., dynamic random-access memory (RAM) and static RAM (SRAM)), a volatile memory (flash memory, programmable read-only memory (PROM), magnetoresistive random-access memory (MRAM) and resistive RAM (RRAM)), a hard disk drive (HDD), or a solid state drive (SSD).

The volatile memory may refer to a memory that requires continuous power supply to maintain stored information. The volatile memory may be implemented as a separate component from the processor 140 that may be interlocked with the processor 140, but this is only an example, and the volatile memory may be implemented in a form included in the processor 140 as a component of the processor 140. In addition, the non-volatile memory may refer to a memory capable of maintaining the stored information even when the power supply is stopped.

The memory 130 may be accessed by the processor 140, and data read/write/edit/delete/update by the processor 140 may be performed. In the disclosure, a term 'memory' may include the memory 130, a read only memory (ROM) in the processor 140, a random access memory (RAM), or a memory card (for example, a micro secure digital (SD) card or a memory stick) mounted in the electronic device 100. In addition, the memory 130 may store programs and data for configuring a variety of screens to be displayed on a display region of a display.

In particular, the memory 130 may store a voice recognition model, which is an artificial intelligence model capable of providing a response to a user's voice. The voice recognition model may be stored in the non-volatile memory, and when a wake-up word uttered by the user is identified, the voice recognition model may be loaded and activated in the volatile memory under the control of the processor 140. The voice recognition model may output a text corresponding to the user's voice and grasp the intention of the output text.

In addition, the memory 130 may store a wake-up word detection model. The wake-up word detection model may be stored in the non-volatile memory and may be loaded and activated in the volatile memory under the control of the processor 140 when the electronic device 100 is powered on. Therefore, when the electronic device 100 is powered on, the wake-up word detection model may be activated to identify the wake-up words included in the first sound signal and the second sound signal.

A plurality of voice recognition models may be stored in the memory 130. In addition, as an example, a wake-up word detection model corresponding to each of the plurality of voice recognition models may be stored in the memory 130. As another example, the memory 130 may store a first wake-up word detection model and a second wake-up word detection model corresponding to each of the plurality of voice recognition models. The first wake-up word detection model is a model that detects and identifies a wake-up word included in the first sound signal input through the microphone 120, and the second wake-up word detection model is a model that detects and identifies a wake-up word included in the second sound signal output through the speaker 110.

The processor 140 may be electrically connected to the memory 130 to control an overall operation and function of the electronic device 100. In particular, while the first sound signal is input through the microphone 120, the processor 140 may identify whether the wake-up word is included in the second sound signal by inputting the second sound signal output through the speaker 110 into the wake-up word detection model.

When it is identified that the wake-up word is included in the second sound signal, the processor 140 may control the voice recognition model so as not to be activated even if the wake-up word is included in the first sound signal. That is, because the wake-up word included in the first sound signal output through the speaker 110 is not a wake-up word uttered by the user to activate the voice recognition model, the processor 140 may control the voice recognition model so as not to be activated.

When it is identified that the wake-up word is not included in the second sound signal, the processor 140 may identify whether the wake-up word is included in the first sound signal by inputting the first sound signal input through the microphone 120 into the wake-up word detection model. As an example, when it is identified that the wake-up word is included in the first sound signal, the processor 140 may activate the voice recognition model. For example, when it is identified that the wake-up word is not included in the first sound signal, the processor 140 may control the voice recognition model so as not to be activated.

In addition, when the plurality of voice recognition models are stored in the memory 130, the processor 140 may identify whether one of the wake-up words corresponding to each of the plurality of voice recognition models is included in the second sound signal by inputting the second sound signal into all of the wake-up word detection models corresponding to each of the plurality of voice recognition models.

When it is identified that the wake-up words corresponding to each of the plurality of voice recognition models are not included in the second sound signal, the processor 140 may identify whether one of the wake-up words corresponding to each of the plurality of voice recognition models is included in the first sound signal by inputting the first sound signal to the wake-up word detection models corresponding to each of the plurality of voice recognition models. When it is identified that one of the wake-up words corresponding to each of the plurality of voice recognition models is included in the first sound signal, the processor 140 may activate the voice recognition model. As another example, when it is identified that the wake-up word is not included in the first sound signal, the processor 140 may control the voice recognition model so as not to be activated.

When it is identified that one of the wake-up words corresponding to each of the plurality of voice recognition models is included in the second sound signal, the processor 140 may control the voice recognition model so as not to be activated even if one of the wake-up words corresponding to the plurality of voice recognition models is included in the first sound signal.

According to another embodiment, the processor 140 may identify whether one of the wake-up words corresponding to each of the one or more voice recognition models is included in the first sound signal by inputting the first sound signal input through the microphone 120 into the first wake-up word detection model corresponding to each of the one or more voice recognition models.

When it is identified that one of the wake-up words corresponding to the one or more voice recognition models is not included in the first sound signal, the processor 140 may control the voice recognition model so as not to be activated. That is, because the wake-up word is not included in the first sound signal input through the microphone 120 may mean that the user has not uttered the wake-up word for activating the voice recognition model, the processor 140 may control the voice recognition model so as not to be activated.

When it is identified that one of the wake-up words is included in the first sound signal, the processor 140 may identify whether one of the identified wake-up words is included in the second sound signal by inputting the second sound signal output through the speaker 110 into the second wake-up word detection model corresponding to one of the identified wake-up words. That is, because a case in which the wake-up word is included in the first sound signal input through the microphone 120 may include a case in which the wake-up word is included in the second sound signal output through the speaker 110, the processor 140 may identify whether one of the identified wake-up words is also included in the second sound signal. For example, when it is identified that one of the identified wake-up words is included in the second sound signal through the second wake-up word detection model corresponding to one of the wake-up words, the processor 140 may control the voice recognition model so as not to be activated. As another example, when it is identified that one of the wake-up words is not included in the second sound signal, the processor 140 may control the voice recognition model so as to be activated.

In addition, the processor 140 may include one or more of a central processing unit (CPU) that processes a digital signal, a micro controller unit (MCU), a micro processing unit (MPU), a controller, an application processor (AP), a communication processor (CP), and an ARM processor, or may be defined as the corresponding term. In addition, the processor 140 may also be implemented as a system-on-chip (SoC) or a large scale integration (LSI) in which a processing algorithm is embedded, and may also be implemented in the form of a field programmable gate array (FPGA). In addition, the processor 140 may perform various functions by executing computer executable instructions stored in the memory 130. In addition, the processor 140 may include at least one of a graphics-processing unit (GPU), a neural processing unit (NPU), or a visual processing unit (VPU), which is a separate AI-only processor in order to perform an artificial intelligence function.

Figure 2B:
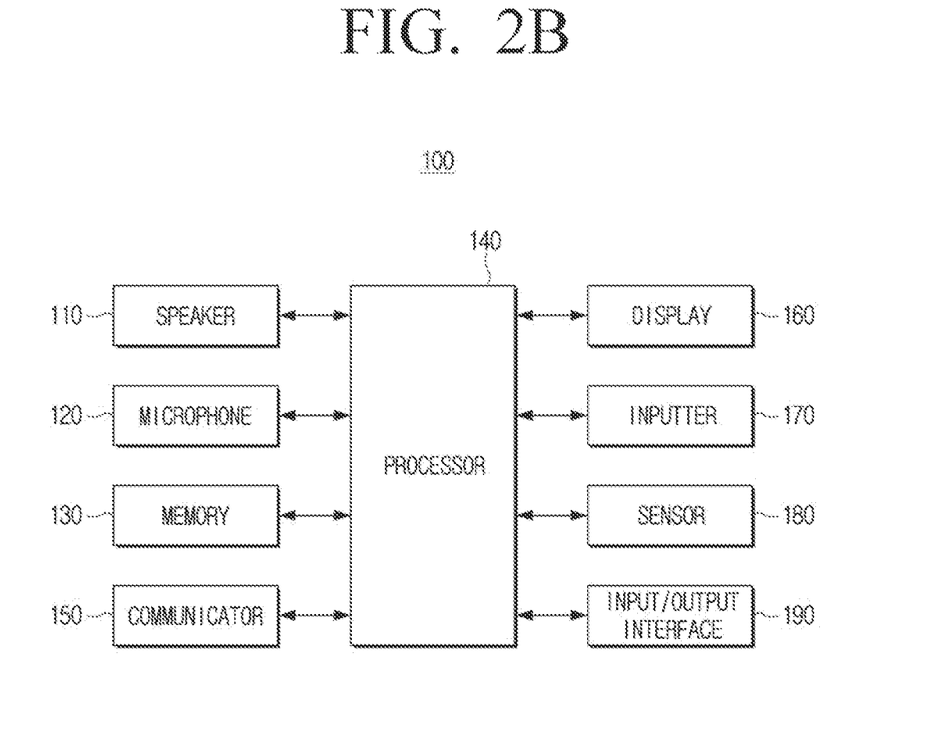
FIG. 2B is a block diagram illustrating in detail the configuration of the electronic device of FIG. 2A according to an embodiment.

FIG. 2B is a block diagram illustrating in detail the configuration of the electronic device 100 according to an embodiment of the disclosure. As illustrated in FIG. 2B, the electronic device 100 may include the speaker 110, the microphone 120, the memory 130, the processor 140, a communicator 150, a display 160, an inputter 170, a sensor 180, and an input/output interface 190. Since the speaker 110, the microphone 120, the memory 130, and the processor 140 have been described in detail with reference to FIG. 2A, redundant descriptions thereof will be thus omitted.

The communicator 150 may include a circuit and communicate with an external device. The communication connection between the communicator 150 and the external device may include communicating through a third device (e.g., a repeater, a hub, an access point, a server, or a gateway). In particular, the communicator 150 may receive a second sound signal from the remote control 200 through various communication modules such as a Bluetooth module, and input and transmit the second sound signal to the processor 140.

The communicator 150 may include various communication modules to perform communication with the external device. As an example, the communicator 150 may include a wireless communication module, and may include, for example, a cellular communication module that uses at least one of long-term evolution (LTE), LTE Advance (LTE-A), code division multiple access (CDMA), wideband CDMA (WCDMA), 5th generation (5G), universal mobile telecommunications system (UMTS), Wireless Broadband (WiBro), or Global System for Mobile Communications (GSM). As another example, the wireless communication module may include, for example, at least one of wireless fidelity (Wi-Fi), Bluetooth, Bluetooth low power (BLE), Zigbee, near field communication (NFC), magnetic secure transmission, radio frequency (RF), or a body area network (BAN).

The display 160 may display various information according to the control of the processor 140. In particular, when the voice recognition model is activated, the display 160 may display an indicator indicating that the voice recognition model is activated under the control of the processor 140. In addition, the display 160 may display a message or UI requesting a user's voice to be input to the voice recognition model under the control of the processor 140.

In addition, the display 160 may be implemented as a touch screen together with a touch panel. In addition, the panel of the display 160 may be implemented by various display technologies such as a liquid crystal display (LCD), an organic light emitting diode (OLED), an active-matrix organic light-emitting diode (AM-OLED), a liquid crystal on silicon (LcoS), a quantum dot light-emitting diode (QLED), and a digital light processing (DLP).

The inputter 170 may receive a user input for controlling the electronic device 100. In particular, the inputter 170 may include a touch panel for receiving a user touch using a user's hand or a stylus pen, and a button for receiving a user manipulation. In addition, the inputter 170 may be implemented as another input device (e.g., a keyboard, a mouse, a motion inputter, and the like).

The sensor 180 may include a sensor capable of detecting environmental information around the electronic device 100 (e.g., a temperature sensor, a humidity sensor, an air pressure sensor, and the like), a sensor capable of detecting a presence of the user (e.g., a camera, a UWB sensor, an IR sensor, a proximity sensor, an optical sensor, and the like), and the like. In addition, the sensor 180 may include an image sensor for photographing the outside of the electronic device 100.

The input/output interface 190 may input and output at least one of audio and video signals. In particular, the input/output interface 190 may receive an image including at least one of a content and a UI from the external device, and may output a control command to the external device. The input/output interface 190 may be a high definition multimedia interface (HDMI), but this is only an example, and the input/output interface 190 may be any one of a mobile high-definition link (MHL), a universal serial bus (USB), a display port (DP), a thunderbolt, a video graphics array (VGA) port, an RGB port, a D-subminiature (D-SUB), and a digital visual interface (DVI). According to an embodiment, the input/output interface 190 may include a port for inputting and outputting only the audio signal and a port for inputting and outputting only the video signal as separate ports, or may be implemented as one port for inputting and outputting both the audio signal and the video signal. The communicator 150 and the input/output interface 190 are illustrated as separate components, but this is only an example, and the input/output interface 190 may be implemented in a form included in the communicator 150.

Figure 3:
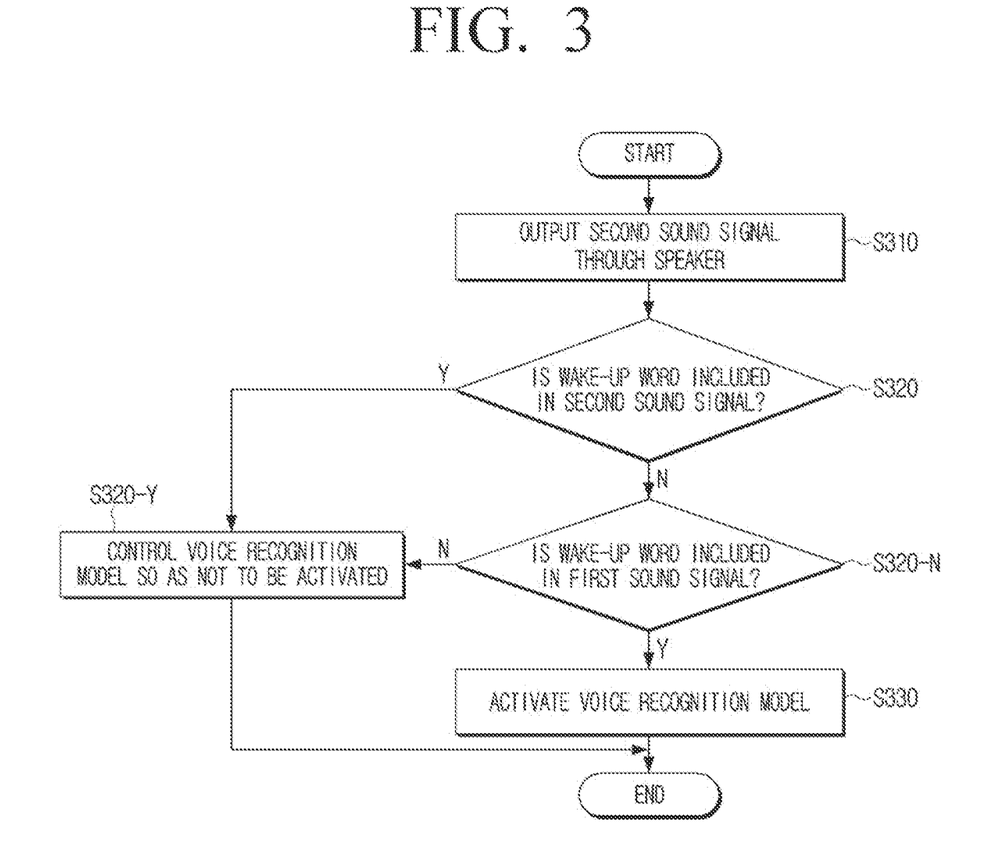
FIG. 3 is a flowchart of an operating method of the electronic device according to an embodiment.

FIG. 3 is a flowchart of an operation of the electronic device 100 according to an embodiment. First, the electronic device 100 may output a second sound signal through the speaker 110 (S310). The electronic device 100 may output, through the speaker 110, the second sound signal that has experienced decoding, amplification, and noise filtering by the audio processor, and may store the second sound signal to be output in a storage space such as a register or a memory. In addition, while the first sound signal is input through the microphone 110, the electronic device 100 may identify whether a wake-up word is included in the second sound signal by inputting the second sound signal into a wake-up word detection model (S320).

If it is identified that the wake-up word is included in the second sound signal, the electronic device 100 may control a voice recognition model so as not to be activated (Yin S320). If it is identified that the wake-up word is not included in the second sound signal, the electronic device 100 may identify whether the wake-up word is included in the first sound signal by inputting the first sound signal into the wake-up word detection model (N-S320). The electronic device 100 may control a parameter of the wake-up word detection model that inputs the first sound signal to be changed. That is, the electronic device 100 may change a calculation parameter of the wake-up word detection model to which the first sound signal is to be input so that noise filtering and reverberation effects are removed.

If it is identified that the wake-up word is not included in the first sound signal, the electronic device 100 may control the voice recognition model so as not to be activated (Y in S320). In addition, if it is identified that the wake-up word is included in the first sound signal, the electronic device 100 may activate the voice recognition model (S330).

In the above embodiment, during a delay time in which the first sound signal input through the microphone 120 is transmitted to the electronic device 100 through a wired/wireless interface, because the electronic device 100 identifies whether the wake-up word is included in the second sound signal, and identifies whether the wake-up word is included in the first sound signal, the electronic device 100 may determine whether to activate the voice recognition model without additional time compared to an embodiment according to a second flowchart to be described later.

Figure 4:
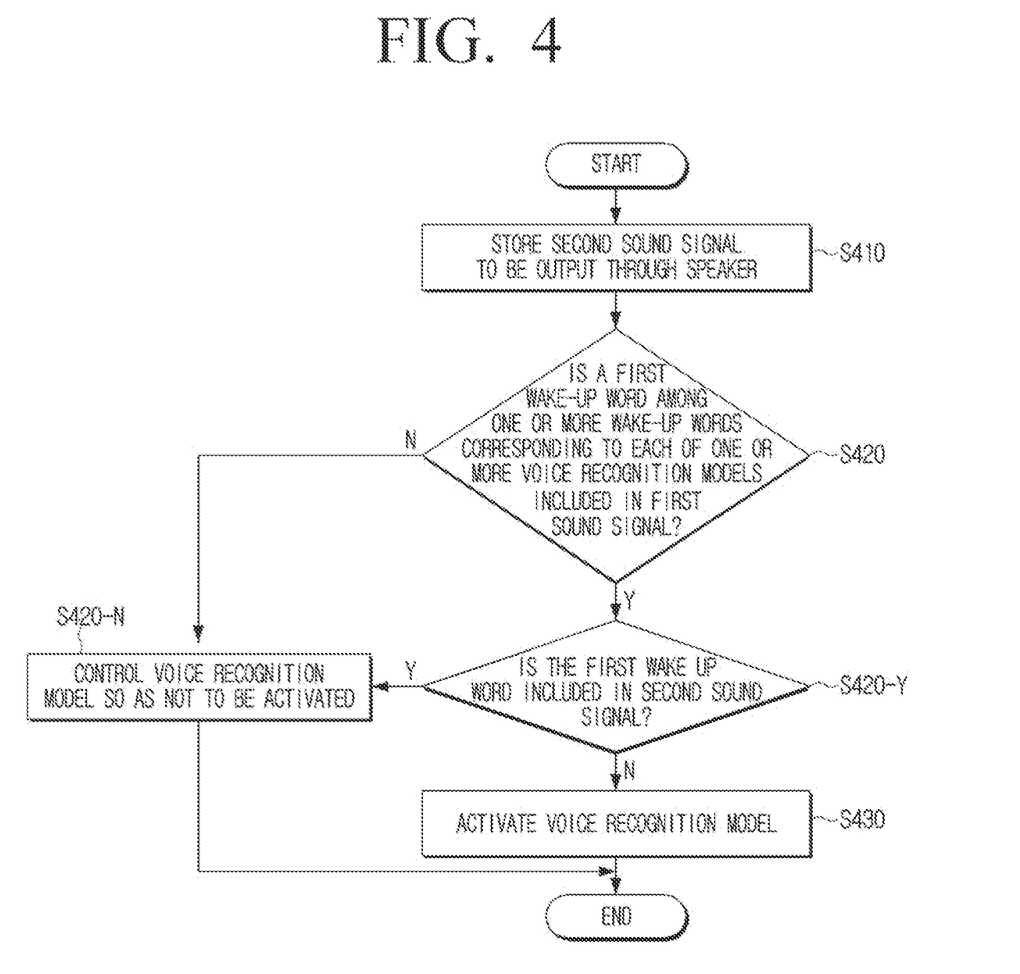
FIG. 4 is a flowchart of another operating method of the electronic device according to an embodiment.

FIG. 4 is a second flowchart of an operation of the electronic device 100 according to another embodiment.

First, the electronic device 100 may store the second sound signal to be output through the speaker 110 in a memory or a register (S410). In addition, the electronic device 100 may identify whether a first wake-up word among one or more the wake-up words corresponding to each of the one or more voice recognition models is included in the first sound signal by inputting the first sound signal input through the microphone 120 into a first wake-up word detection model corresponding to each of the one or more voice recognition models (S420).

If it is identified that the first wake-up word is not included in the first sound signal, the electronic device 100 may control the voice recognition model so as not to be activated (N in S420). Meanwhile, if it is identified that the first wake-up word is included in the first sound signal, the electronic device 100 may identify whether one of the identified wake-up words is included in the second sound signal (Yin S420). Specifically, the electronic device 100 may identify whether one or more of the identified wake-up words is included in the second sound signal by inputting the second sound signal into a detection model corresponding to one of the identified wake-up words among one or more second wake-up word detection models.

If it is identified that one of the identified wake-up words is included in the second sound signal, the electronic device 100 may control the voice recognition model so as not to be activated (N in S420). In addition, if it is identified that one of the identified wake-up words is not included in the second sound signal, the electronic device 100 may activate the voice recognition model (S430).

In the above-embodiment, when a plurality of voice recognition models are stored, the electronic device 100 may first identify which wake-up word is included in the first sound signal input through the microphone 120, and may grasp a user's intention by inputting the second sound signal only into the detection model corresponding to the identified wake-up word among the plurality of second wake-up word detection models. That is, the electronic device 100 may use fewer resources of the processor 140 and the memory 130 compared to the embodiment of FIG. 3.

Figure 5:
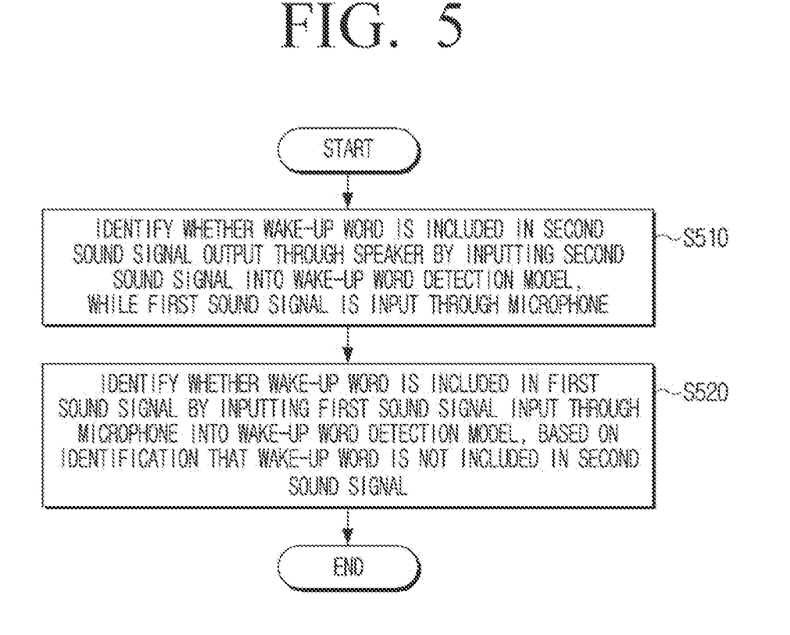
FIG. 5 is a flowchart of a method for controlling an electronic device according to an embodiment.

FIG. 5 is a flowchart of a method for controlling the electronic device 100 according to another embodiment.

First, while a first sound signal is input through the microphone 120, the electronic device 100 may identify whether a wake-up word is included in a second sound signal by inputting the second sound signal output through the speaker 110 into a wake-up word detection model (S510). Because the electronic device 100 stores a second sound signal to be output through the speaker 110, and the first sound signal is input through a wired/wireless interface, the first sound signal and the second sound signal may be distinguished.

In addition, if it is identified that the wake-up word is not included in the second sound signal, the electronic device 100 may identify whether the wake-up word is included in the first sound signal by inputting the first sound signal input through the microphone 120 into the wake-up word detection model (S520). If the wake-up word is included in the first sound signal, the electronic device 100 may activate the voice recognition model, but if the wake-up word is not included in the first sound signal, the electronic device 100 may control the voice recognition model so as not to be activated.

Figure 6:
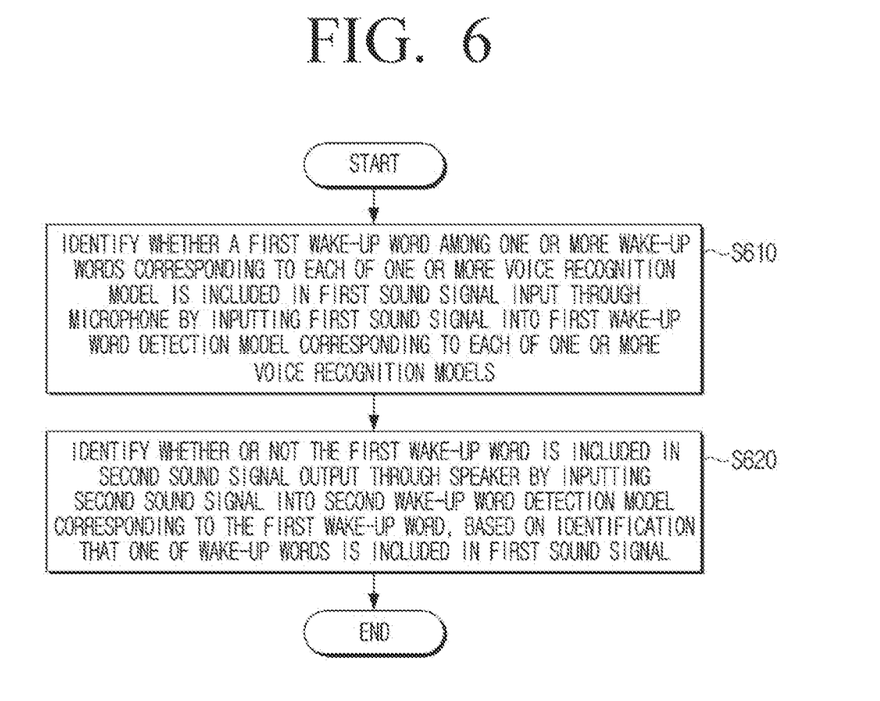
FIG. 6 is a flowchart of another method for controlling an electronic device according to an embodiment.

FIG. 6 is a flowchart for describing a method for controlling the electronic device 100 according to another embodiment.

The electronic device 100 may identify whether a first wake-up word among one or more the wake-up words corresponding to each of the one or more voice recognition models is included in the first sound signal by inputting the first sound signal input through the microphone into a first wake-up word detection model corresponding to each of the one or more voice recognition models (S610). In addition, if it is identified that the first wake-up word is included in the first sound signal, the electronic device 100 may identify whether the first wake-up word is included in the second sound signal by inputting the second sound signal output through the speaker 110 into the second wake-up word detection model corresponding to the first wake-up word. If it is identified that the identified first wake-up word is included in the second sound signal, the electronic device 100 may control the voice recognition model so as not to be activated. In addition, if it is identified that the identified first wake-up words not included in the second sound signal, the electronic device 100 may control the voice recognition model to be activated.

The electronic device according to diverse embodiments of the disclosure described above distinguishes between a signal of the user's voice input through the microphone and the wake-up word included in the signal of the voice output from the electronic device, so that the user may efficiently utilize voice recognition technology without using AEC technology.

The drawings attached to the disclosure are not intended to limit the technology described in the disclosure to a specific embodiment, and include various modifications, equivalents, and/or alternatives of the embodiments of the disclosure. Throughout the accompanying drawings, similar components will be denoted by similar reference numerals.

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. Here, the term 'non-transitory storage medium' means that it does not contain a signal and is tangible, but does not distinguish between semi-permanent or temporary storage of data in the storage medium. For example, the 'non-transitory storage medium' may include a buffer in which the data is temporarily stored.

According to an embodiment, the method according to the diverse embodiments disclosed in the disclosure may be included in a computer program product and provided. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product (e.g., a downloadable app) may be at least temporarily stored in a storage medium such as a memory of a server of a manufacturer, a server of an application store, or a relay server, or may be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other components according to the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the scope of the disclosure as disclosed in the accompanying claims. Such modifications should not be individually understood from the technical spirit or the prospect of the disclosure.

What is claimed is:

1. An electronic device comprising:
   a speaker;
   a microphone;
   at least one memory storing one or more instructions; and
   at least one processor configured to execute the one or more instructions, wherein the one or more instructions, when executed by the at least one processor, cause the electronic device to:
   receive a wake-up word through the microphone,
   abased on the wake-up word being included in a first sound signal that is output through the speaker, cause a voice recognition function not to be activated, and
   based on that the wake-up word being included in a second sound signal obtained from a user voice, active the voice recognition function regardless of whether the wake-up word is included in the first sound signal.

2. The electronic device of claim 1, wherein the at least one memory further stores a plurality of voice recognition models, and wherein the one or more instructions, when executed by the at least one processor, further cause the electronic device to:

identify whether-a first wake-up word among a plurality of wake-up words corresponding to each of the plurality of voice recognition models is included in the first sound signal by inputting the first sound signal into a wake-up word detection model corresponding to each of the plurality of voice recognition models.

3. The electronic device of claim 2, wherein the one or more instructions, when executed by the at least one processor, further cause the electronic device to:

based on identifying that the first wake-up word is not included in the first sound signal, identify whether the first wake-up word is included in the second sound signal by inputting the second sound signal into the wake-up word detection model corresponding to each of the plurality of voice recognition models.

4. A method for controlling an electronic device, the method comprising:

receiving wake-up word through a microphone of the electronic device;

based on a wake-up word being included in a first sound signal that is output through a speaker of the electronic device, causing a voice recognition function not to be activated; and based on the wake-up word being included in a second sound signal obtained from a user voice, activating the voice recognition function regardless of whether the wake-up word is included in the first sound signal.

5. The method of claim 4, wherein a plurality of voice recognition models are stored in a memory of the electronic device, and wherein the method further comprises:

identifying whether-a first wake-up word among a plurality of wake-up words corresponding to each of the plurality of voice recognition models is included in the first sound signal by inputting the first sound signal into a wake-up word detection model corresponding to each of the plurality of voice recognition models.

6. The method of claim 5, further comprising:

based on identifying that the first wake-up word is not included in the first sound signal, identifying whether the first wake-up word is included in the second sound signal by inputting the second sound signal into the wake-up word detection model corresponding to each of the plurality of voice recognition models.

* * * * *